(12) United States Patent
Smith, Jr. et al.

(10) Patent No.: US 6,805,381 B2
(45) Date of Patent: Oct. 19, 2004

(54) MAGNETORHEOLOGICAL SEAT BELT ACTUATOR

(75) Inventors: Ronald G. Smith, Jr., New Carlisle, OH (US); Michael L. Oliver, Xenia, OH (US); William C. Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/789,036

(22) Filed: Feb. 20, 2001

(65) Prior Publication Data

US 2002/0113424 A1 Aug. 22, 2002

(51) Int. Cl.[7] .............................................. B60R 22/46
(52) U.S. Cl. ........................ 280/806; 280/807; 242/381
(58) Field of Search ............................... 280/806, 807; 242/243, 285, 291, 381

(56) References Cited

U.S. PATENT DOCUMENTS

| | | | | |
|---|---|---|---|---|
| 3,912,035 A | * | 10/1975 | Ulert | 180/268 |
| 4,211,377 A | * | 7/1980 | Yasumatsu | 188/65.1 |
| 4,940,194 A | * | 7/1990 | Young | 188/267 |
| 5,248,113 A | * | 9/1993 | Daniels | 188/158 |
| 5,289,992 A | * | 3/1994 | Du Plessis et al. | 242/287 |
| 5,417,314 A | * | 5/1995 | Sproston et al. | 137/909 |
| 5,503,341 A | * | 4/1996 | Kaneko et al. | 242/223 |
| 5,556,048 A | * | 9/1996 | Hashimoto | 242/288 |
| 5,749,533 A | * | 5/1998 | Daniels | 188/268 |
| 6,019,392 A | * | 2/2000 | Karlow | 242/381 |
| 6,045,076 A | * | 4/2000 | Daniels | 188/268 |

FOREIGN PATENT DOCUMENTS

| | | | | |
|---|---|---|---|---|
| GB | 2250675 | * | 6/1992 | 280/806 |

* cited by examiner

*Primary Examiner*—Paul N. Dickson
*Assistant Examiner*—Toan C To
(74) *Attorney, Agent, or Firm*—Michael D. Smith

(57) ABSTRACT

A seatbelt retractor is operably coupled to a belt dereeling retarder mechanism which utilizes a magnetorheological fluid and a coil for imposing a magnetic field on the fluid to selectively change the fluid properties and a braking or retarding effect imposed on the belt retractor during dereeling or payout of the belt. The retarder may include a piston coupled to a rotatable shaft coupled to the belt retractor reel and displacing fluid through the magnetic field in response to actuation of the belt. Alternate embodiments include a multiple disc brake coupled to the retractor reel through a gear drive speed increaser or a cylindrical housing and core member defining an annular space occupied by the magnetorheological fluid and connected to the belt retractor reel through a speed increasing gear drive.

10 Claims, 9 Drawing Sheets

MAGNETORHEOLOGICAL SEAT BELT ACTUATOR

FIELD OF THE INVENTION

The present invention pertains to a seat belt actuator/retarder for absorbing energy and controlling seat belt payout during an impact or high levels of acceleration imposed on the belt wearer in a vehicle.

BACKGROUND

In the application of seat belts and so-called shoulder belts in vehicles, the sudden acceleration of and energy transferred to the belt wearer in the event of a vehicle collision or extreme deceleration is typically absorbed by the belt material and some deflection of the belt retractor mechanism. When vehicle seat and shoulder belts are used in conjunction with inflatable "airbags" or so-called supplemental restraint systems, it is desirable to also prevent the belt wearer from moving forward toward the airbag until the bag has had an opportunity to deploy fully so as to minimize injurious impact forces.

The energy of the impact during a collision or other forms of extreme deceleration is transferred from the vehicle occupant to the seat belt, and this energy in conjunction with the deployment of an airbag-type restraint can injure such occupant. Accordingly, it is desirable to minimize such impact by varying the rate of the so-called payout of the belt system thereby slowing down forward movement of the belt wearer toward the vehicle steering column, dashboard or instrument panel in order to minimize injury caused by the belt (seat and/or shoulder) and to allow the airbag to fully deploy, thus minimizing impact forces on the vehicle occupant.

The aforementioned problem is aggravated when shorter and lighter weight occupants occupy the vehicle since such persons are normally seated closer to the steering wheel or control column, in the case of the vehicle driver, when an airbag type restraint deploys. Accordingly, such vehicle occupants have less distance to travel toward the steering wheel or control column so they tend to impact an airbag type restraint when it is in the initial phase of inflation.

Therefore, it has been deemed desirable to provide an energy absorption mechanism which may be operably connected to or form part of a seat and/or shoulder belt retractor mechanism to control the restraining forces and/or so-called unreeling or payout of the belt to minimize injury to the belt wearer. It is to these ends that the present invention has been developed.

SUMMARY OF THE INVENTION

The present invention provides an actuator which is operable to control or retard the unreeling or payout of a seat belt, so-called shoulder belt or similar restraint worn by an occupant of a vehicle to minimize injury to the occupant in the event of a collision or other event which causes extreme deceleration of the vehicle.

In accordance with one aspect of the present invention, an actuator is provided which includes mechanism responsive to a magnetorheological fluid acting on the mechanism in such a way that the payout or restraining forces acting on the belt or similar restraint may be selectively varied during a collision or rapid deceleration of a vehicle so as to minimize injury to the belt wearer in the vehicle. The actuator includes mechanism for generating a magnetic field to act on a magnetorheological fluid to control the shear properties of the fluid and thereby effect operation of the actuator mechanism to selectively control the payout of or retarding forces acting on the belt or a similar restraint device. The magnetic field may be controlled in relation to sensing the weight of the occupant wearing the belt and in relation to sensing the deceleration of the vehicle due to a collision or other event.

The belt actuator of the present invention may be operably connected to a conventional seat belt retractor mechanism or configured to be drivably connected to a belt retractor reel and form part of the belt retractor per se.

In one embodiment of the invention a rotatable shaft operably connected to the seat belt retractor reel drives a piston to displace a magnetorheological fluid through a magnetic field formed by an electric coil, the magnetic field extending transversely across a restricted flow path for the magnetorheological fluid. The intensity of the magnetic field may be selectively varied in accordance with certain control parameters including parameters associated with the belt wearer's weight and the intensity of the collision or other event which causes rapid deceleration of the vehicle.

In another embodiment, the invention includes a multi-plate clutch or disc-type brake mechanism in which a magnetorheological fluid is disposed between adjacent plates or discs and a magnetic field may be imposed on the fluid by a coil disposed adjacent the plates. Relative rotation of alternate ones of the plates or discs may be controlled in relation to the rotative speed of the belt retractor reel by a speed increasing planetary type gearset, for example.

The present invention still further contemplates an embodiment of a magnetorheological seat belt actuator or retarder which comprises a stator or core member supporting an electromagnetic coil over which is sleeved an annular, somewhat cylindrical can-shaped rotor which is drivably connected to the seat belt retractor or may form part of the seat belt retractor reel. An annular space between the stator and the rotor is filled with a magnetorheological fluid whose shear properties may be varied by an electrical signal imposed on the coil to selectively vary the forces required to rotate the rotor and thus the rate of payout of a belt or similar restraint device connected to the actuator.

Those skilled in the art will further appreciate the above-mentioned advantages and superior features of the restraint belt actuator or retarder of the invention upon reading the detailed description which follows in conjunction with the drawings.

DETAILED DESCRIPTION OF THE PREFERRED EMBODIMENTS

Figure 1:
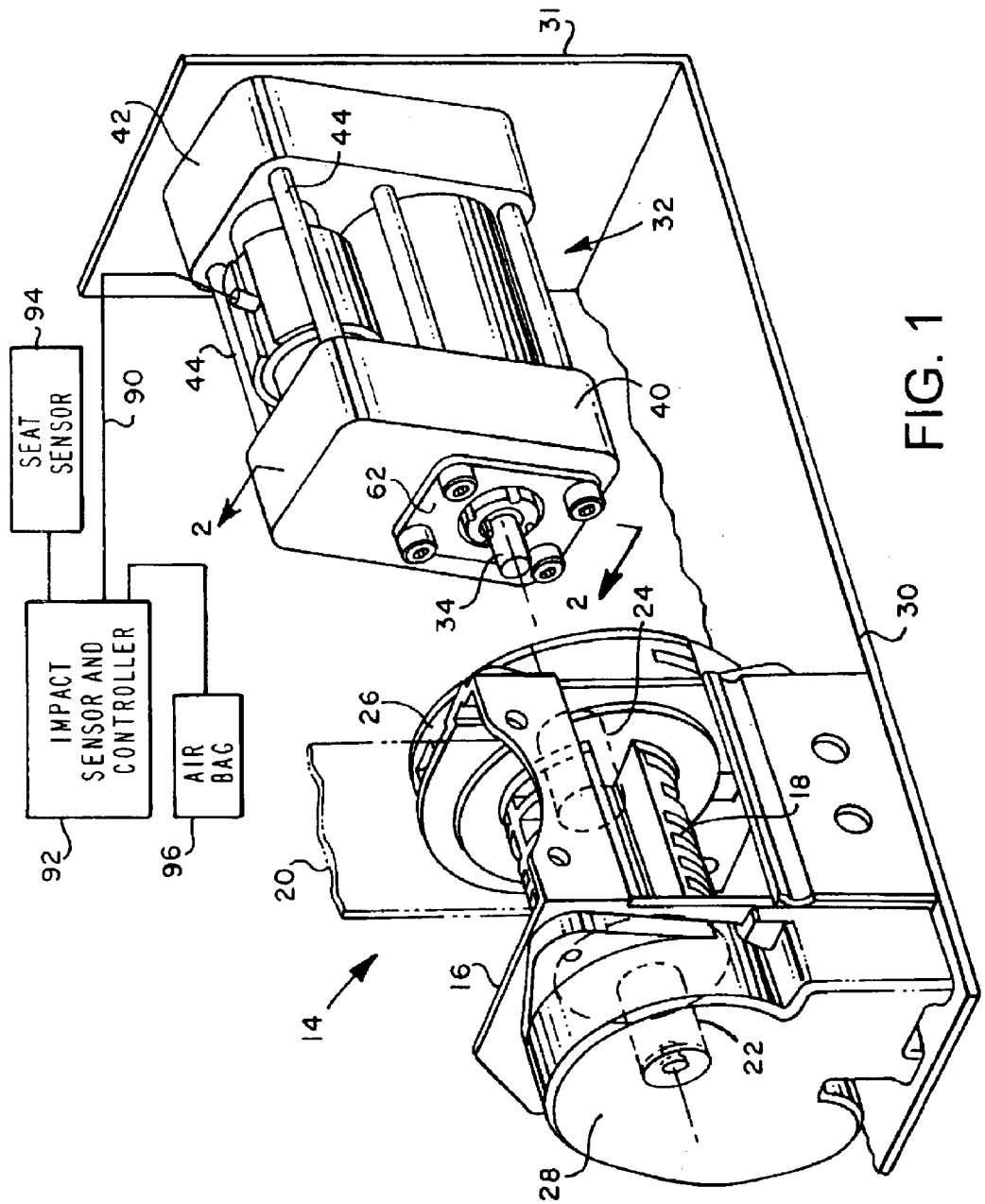
FIG. 1 is a perspective view of a so-called seat belt or similar restraint belt retractor and showing one embodiment of an actuator mechanism in accordance with the invention.

In the description which follows like parts are marked throughout the specification and drawing with the same reference numerals, respectively. The drawing figures are not necessarily to scale and certain components may be shown in generalized or somewhat schematic form in the interest of clarity and conciseness.

Referring to FIG. 1, there is illustrated a seat belt retractor, generally designated by the numeral 14 which may be, essentially, of a type commercially available from the assignee of the present invention. The seat belt retractor 14 includes a frame 16 on which is mounted for rotation a belt retractor reel 18. Belt retractor reel 18 is adapted to wind thereon and payout, respectively, a flexible fabric belt 20, a portion of which is shown in FIG. 1 at least partially wound on the retractor reel 18. The seat belt 20 may be of a type used in automotive vehicles, aircraft or other vehicles and may also include a configuration which provides a lap belt portion and a so-called shoulder belt portion of a type known in the art. Reel 18 is adapted to be supported on frame 16 by opposed reel support shaft portions 22 and 24. Shaft portion 24 may be engaged with a belt retractor spring mechanism, generally designated by numeral 26, and reel shaft portion 22 may be engaged with a suitable inertia type lock mechanism 28. However, lock mechanism 28 may be eliminated or modified for use of the belt retractor in conjunction with the actuator or retarder mechanisms of the present invention. Retractor 14 is shown mounted on a suitable frame part 30 which may comprise a part of the frame of an automotive vehicle, aircraft or other type vehicle requiring a belt type restraint apparatus for an occupant person.

One preferred embodiment of a belt type restraint actuator in accordance with the invention is illustrated in FIG. 1 and generally designated by the numeral 32. The actuator 32 is shown mounted on an upstanding part 31 of frame 30 and is adapted to be drivingly connected to shaft portion 24 of the retractor reel 18. For purposes of illustration, the retractor 14 and actuator 32 are shown axially separated in FIG. 1. However, in operation, a rotatable shaft part 34 of actuator 32 is adapted to be drivenly connected in a suitable manner to retractor reel shaft part 24 for rotation therewith.

Figure 2:
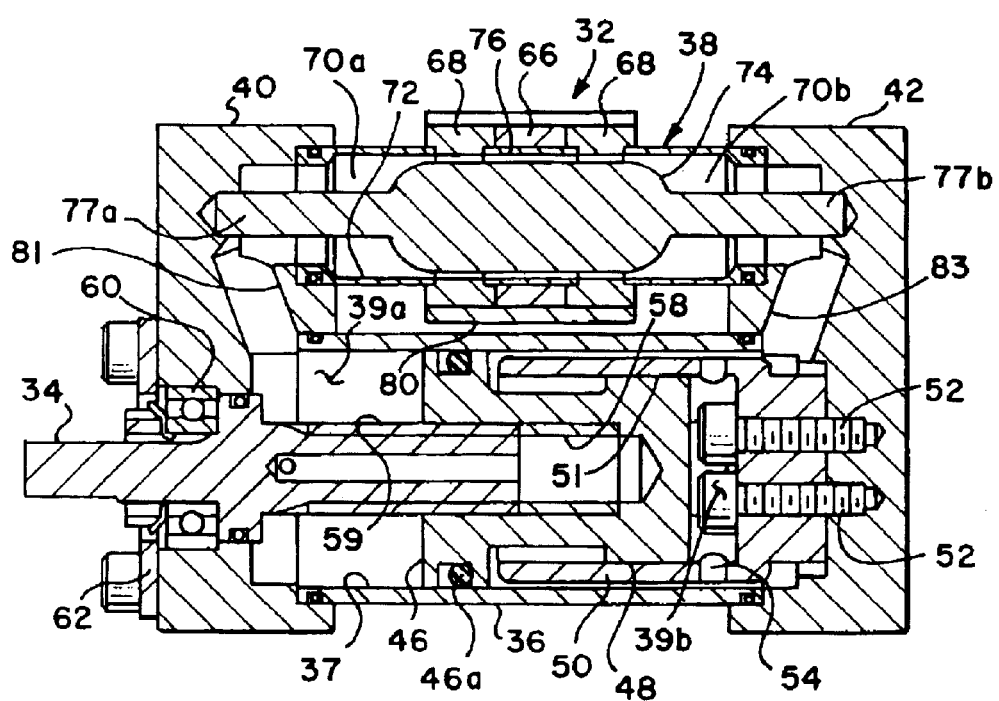
FIG. 2 is a section view taken generally along the line 2—2 of FIG. 1.
Figure 3:
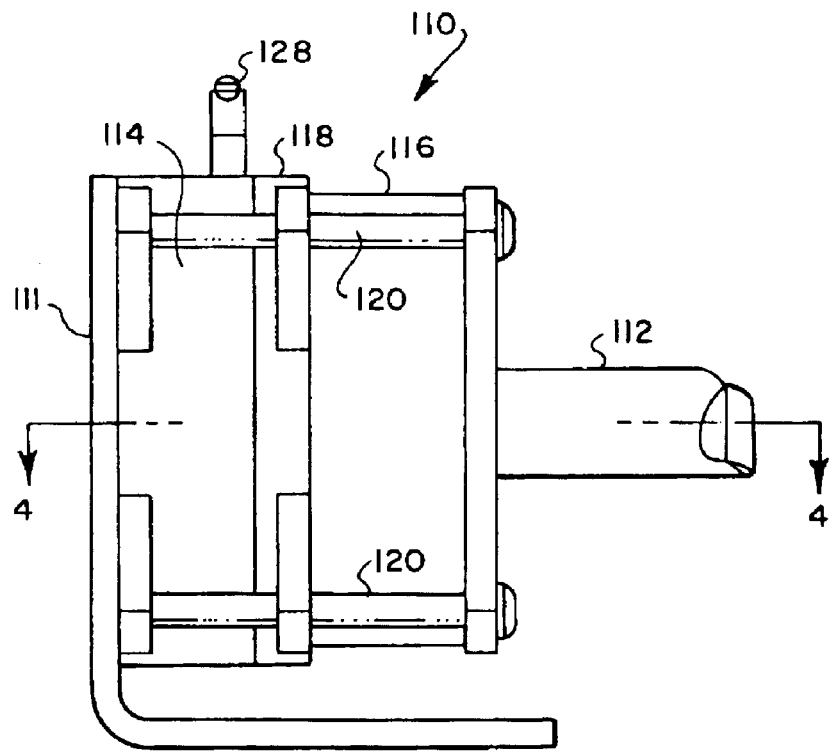
FIG. 3 is a side elevation of a first alternate embodiment of a belt actuator or retarder in accordance with the invention.

Referring further to FIG. 1 and also FIG. 2, the actuator 32 is characterized by a first, generally cylindrical tubular housing part 36 which is co-extensive with and spaced from a second substantially cylindrical tubular housing part 38. Both housing parts 36 and 38 are joined to opposed, somewhat rectangular end plate members 40 and 42 and held in assembly therewith by suitable machine screw type threaded fasteners 44, four shown in FIG. 1.

Referring further to FIG. 2, housing part 36 is adapted to support a generally cylindrical piston 46 for sliding reciprocation within a bore 37 of housing part 36. Piston 46 includes a non-circular axially-projecting hub part 48 which is axially slidably disposed in but non-rotatable with respect to a support member 50 having a non-circular bore 51 formed therein for supporting the hub part 48 of piston 46. Support member 50 is suitably secured to the end plate 42 by threaded fasteners 52, as shown in FIG. 2. One or more fluid transfer ports 54 is formed in support member 50 for communicating pressure fluid between bore 37 and bore 51.

Referring further to FIG. 2, piston 46 includes an axially extending internally-threaded bore 58 formed therein and co-operable with an externally threaded shank part 59 of shaft 34. Shaft 34 is supported on end plate 40 by suitable sealed rolling element bearing means 60 retained on end plate 40 by a removable cover plate 62. Accordingly, in response to rotation of shaft 34, piston 46 is operable to translate axially within bore 37 but not rotate with respect to housing part 36. Piston 46 is in substantially fluid tight sealing engagement with bore 37 by way of an o-ring seal 46a.

Actuator 32 further includes an electromagnetic coil 66 supported on housing part 38 between opposed spacers 68, preferably formed of suitable magnetic material. Interior chambers 70a and 70b are delimited by a core member 74 disposed in a bore 72 of housing part 38. Core member 74 includes a hub portion 76 which is of a diameter slightly less than the diameter of the bore 72 to provide a relatively thin annular flow path or passage between the bore 72 and the hub 76. Core member 74 is suitably supported in actuator or retarder 32 by opposed reduced diameter support portions 77a and 77b which are supported by the opposed end plates 40 and 42, respectively, as shown in FIG. 2. Coil 66 and spacers 68 are suitably retained in assembly with the housing part 38 by a tubular sleeve member 80.

As further shown in FIG. 2, chamber 70a is in communication with a chamber 39a formed between the piston 46 and the end plate 40 by way of a suitable passage 81 formed in end plate 40. In like manner chamber 70b is in communication with a chamber 39b by way of a passage 83 formed in end plate 42. Chamber 39b comprises all of the space between piston 46 and end plate 42 including that occupied by support member 50.

In response to axial translation of the piston 46 from the position shown in FIG. 2 toward the end plate 40 and caused by rotation of shaft 34, fluid is displaced from chamber 39a through passage 81 into chamber 70a and through the annular passage between the bore 72 and the hub 76 of core member 74. Fluid flows through the aforementioned annular passage into chamber 70b and through passage 83 into chamber 39b. In response to movement of the piston 46 in the opposite direction, the direction of fluid flow is reversed. The aforementioned chambers and passages of the actuator 32 may be filled with a suitable magnetorheological fluid and in response to energization of the coil 76, the shear properties of such fluid present in the annular passage between the bore 72 and the hub 76 may be selectively varied to change the resistance to flow of fluid between chambers 39a and 39b.

The actuator 32 may be suitably connected to a controller 92 via electrical conductor means 90, also connected to the coil 66, FIG. 1. Controller 92 may include or be connected to an impact sensor array on a vehicle, including suitable accelerometers, not shown. Controller 92 may also be provided with suitable sensors, not shown, which detect closure of a vehicle in which retractor 14 and actuator 32 are disposed with a stationary or non-stationary object, for example. Still further, the controller 92 may be suitably connected to a sensor 94 to detect the weight of the occupant who is being restrained by the belt 20. Lastly, controller 92 may also be suitably connected to a supplemental restraint system, including an airbag actuator 96, operable to effect deployment of an airbag when a suitable signal is provided to or by the controller 92.

Accordingly, controller 92 may be operable to provide a suitable electrical signal to the electromagnetic coil 66 which is correlated with an imminent or actual collision or other rapid deceleration of a vehicle on which the belt actuator 32 is provided, so as to vary the intensity of a magnetic field intersecting the aforementioned annular passage formed between the bore 72 and hub 76 of core member 74. The shear properties of a magnetorheological fluid occupying the internal spaces of the actuator 32 may be varied to impart a selected resistance to rotation of the shaft 34 as the piston 46 is translated to displace the fluid between the chambers 39a and 39b. In this way, the dereeling or payout of belt 20 off of reel 18 may be suitably controlled to allow energy absorption by the actuator 32 of the momentum of the person wearing the belt 20. Resistance to displacement of the magnetorheological fluid between chambers 39a and 39b may thus be the controlling factor in any de-reeling of the belt 20 from the reel 18. The operation of actuator 32 may be controlled in relation to the weight of the occupant wearing the belt 20 as determined by the sensor 94 and by suitable impact sensors or accelerometers whose input signals to the controller 92 are used to control the amount of current conducted to the coil 66 by way of the conductor means 90, thus controlling the intensity of the magnetic field extending across the annular flow path formed between the bore 72 and the hub 76 as previously described.

Referring now to FIGS. 3 through 7, a first alternate embodiment of an actuator in accordance with the invention is illustrated and generally designated by the numeral 110. Actuator 110 may be substituted for the actuator 32 in the arrangement shown in FIG. 1 and, as illustrated, mounted on a somewhat L-shaped support bracket 111 which may be mounted on the support frame 30, 31 in place of the actuator 32. The actuator 110 includes a rotatable shaft 112 which may be coupled to the reel support shaft 24 in place of the shaft 34 for rotation with the reel 18 to retard such rotation in accordance with the function of the actuator of the present invention described hereinabove.

Figure 4:
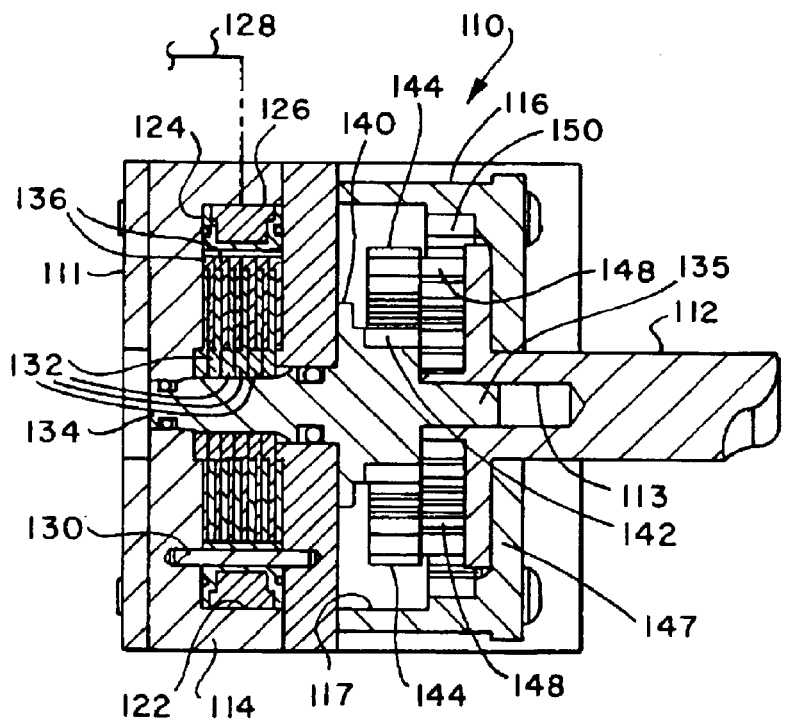
FIG. 4 is a section view taken generally along the line 4—4 of FIG. 3.
Figure 5:
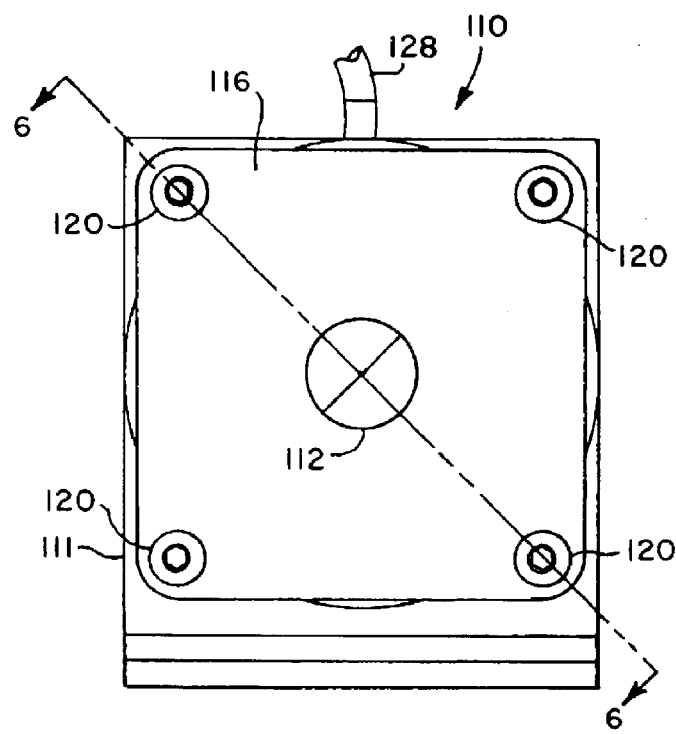
FIG. 5 is an end view of the actuator shown in FIGS. 3 and 4.
Figure 6:
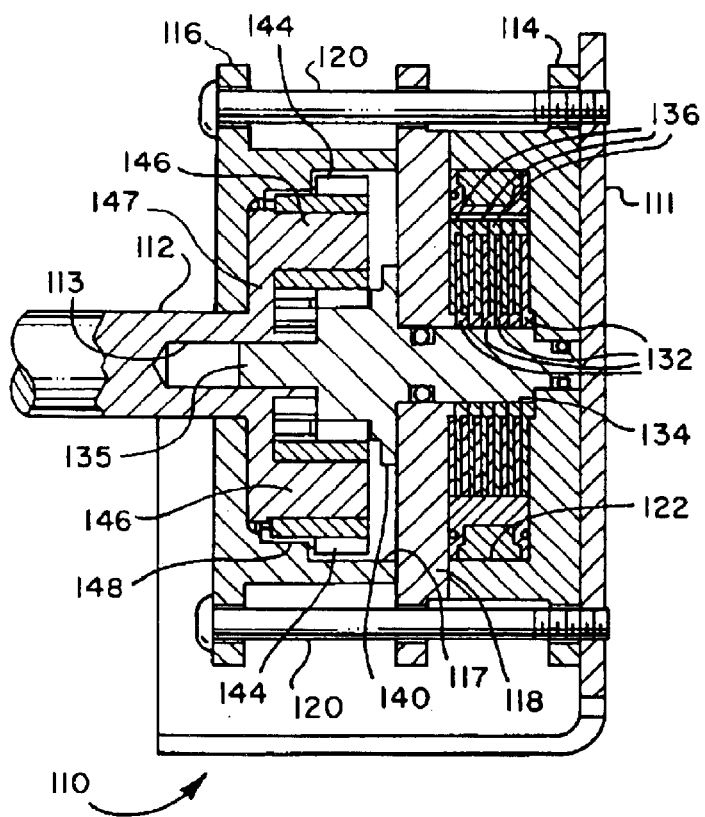
FIG. 6 is a section view taken generally along the line 6—6 of FIG. 5.
Figure 7:
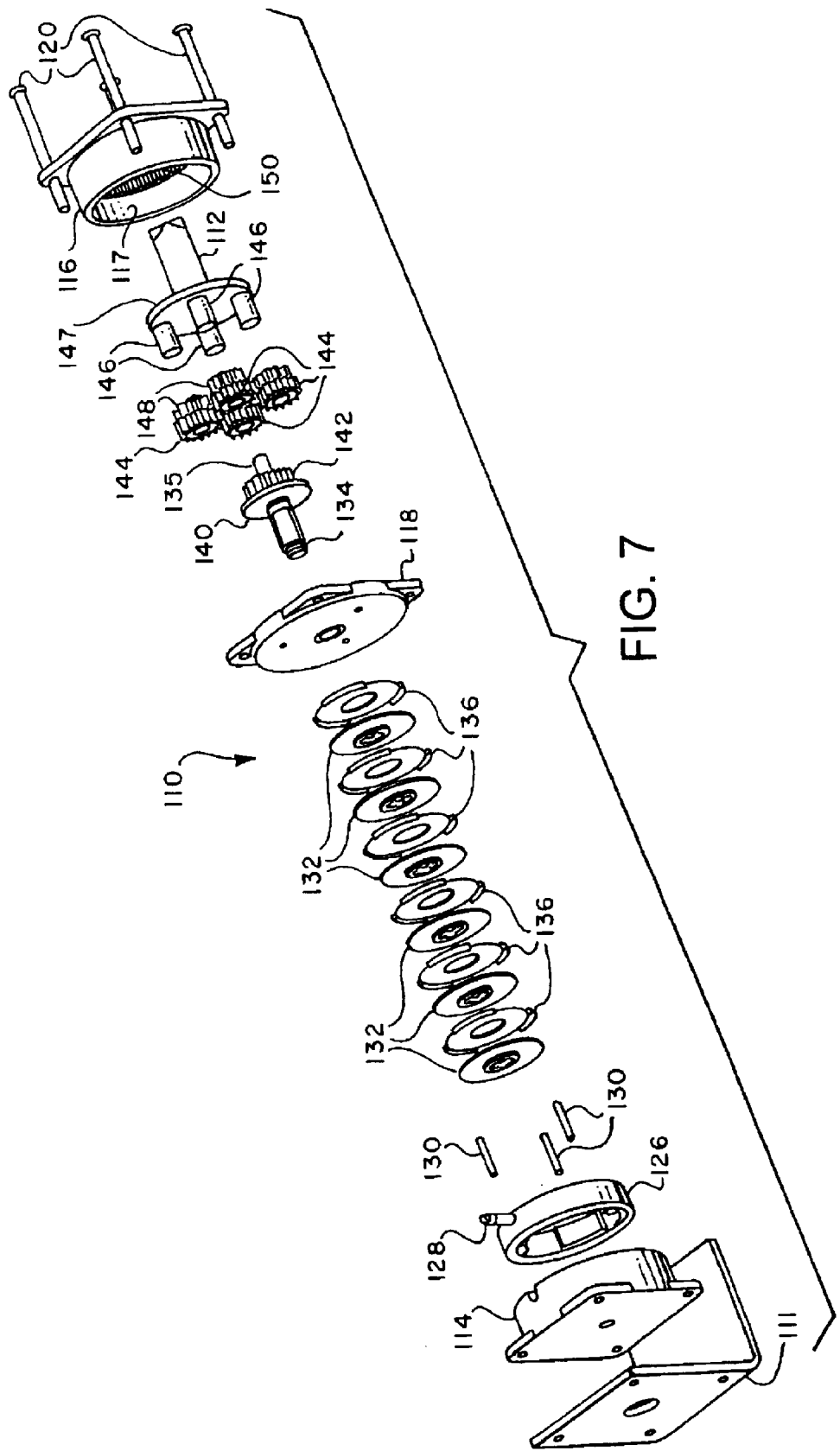
FIG. 7 is an exploded perspective view of the actuator shown in FIGS. 3 through 6.

Referring primarily to FIGS. 4, 6 and 7, the actuator 110 includes a multi-part housing including generally rectangular housing parts 114 and 116 and an intermediate partition member 118. The housing parts 114, 116 and partition 118 are held in assembly by plural, conventional threaded fasteners 120 arranged in a suitable rectangular bolt pattern, as indicated in FIG. 5. Housing 114 includes a generally cylindrical cavity 122 formed therein for receiving a cylindrical brake ring 124 on which is mounted a cylindrical, annular electromagnetic coil 126 adapted to be in electrical signal communication with the controller 92 by way of the conductor means 90 suitably connected to conductor means 128 shown in FIGS. 3, 4, 5 and 7. Accordingly, if the actuator 110 is used in place of the actuator 32, the conductor means 128 would be suitably connected to the conductor means 90 for energizing the coil 126 at a selected voltage and current. Brake ring 124 is secured non-rotatably in housing cavity 122 by one or more retaining pins 130, FIGS. 4 and 7.

The actuator or retarder 110 comprises a multi-disc brake or retarder mechanism comprising plural cylindrical brake discs 132 which are axially-spaced apart and are supported on a sub shaft 134 supported for rotation in housing 114 and by partition 118 as shown in FIGS. 4, 6 and 7. Brake discs 132 are suitably keyed for rotation with shaft 134. A second set of brake discs 136 is arranged for interleaving between the discs 132. Each of the discs 136 is suitably keyed to the ring 124 and is thus held stationary with respect to the housing 114. The portion of the cavity 122 between the shaft 134 and the ring 124 is filled with a suitable magnetorheological fluid which also occupies thin annular spaces between the discs 132 and 136 and whose shear properties may be varied by the intensity of a magnetic field generated by the electromagnetic coil 126. Accordingly, the shearing forces acting between the interleaved discs 132 and 136 may vary in accordance with the intensity of the magnetic field generated by the toroidal coil 126 to impart a selectively variable braking or retarding force on the shaft 134. Suitable o-ring seals may be supported on the shaft 134 and by the ring 124 to provide a fluid-tight seal for the cavity 122 when the actuator 110 is assembled, as shown in FIGS. 4 and 6.

Referring further to FIGS. 4, 6 and 7, the shaft 134 includes a circumferential locating shoulder 140 and an integral sun gear 142 of a differential planetary speed increasing gearset which includes plural circumferentially-spaced differential planet gears 144. Planet gears 144 are rotatably mounted on respective stub shafts 146, FIGS. 6 and 7, which are integrally-formed on a hub 147 of shaft 112 and comprise a planet carrier for the differential planet gears 144. Each of the planet gears 144 includes a second gear part 148, the teeth of which are meshed with a stationary ring gear 150 secured to and preferably formed as part of the housing 116 and disposed within a generally-cylindrical stepped bore or cavity 117 formed in the housing. As further shown in FIGS. 4, 6 and 7, shaft 134 includes a stub shaft part 135 disposed in a bore 113 formed in shaft 112 for supporting the shafts 112 and 134 for coaxial rotation in the housing formed by the housing parts 114 and 116. Cavity 117 may be at least partially filled with a suitable lubricant for lubricating the differential planetary gearset formed by the sun gear 142, the planet gears 144, 148 and the ring gear 150. Thanks to the provision of the differential planetary gearset, the speed of the shaft 134 may be increased relative to the shaft 112 and a substantial selectively variable braking effort may be applied by the magnetorheological fluid acting on the clutch discs 132, 136 so as to retard, in a selective manner, payout of the belt 20 off of the reel 18 when the actuator 110 is connected to the belt retractor 14 in place of the actuator 32.

Figure 8:
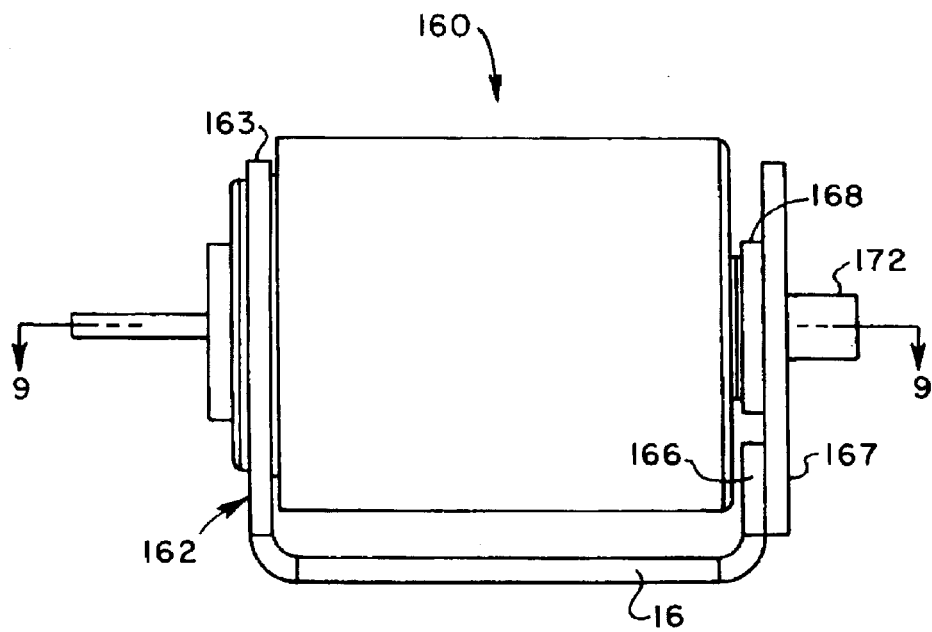
FIG. 8 is a side elevation of a second alternate embodiment of a belt actuator in accordance with the invention.
Figure 9:
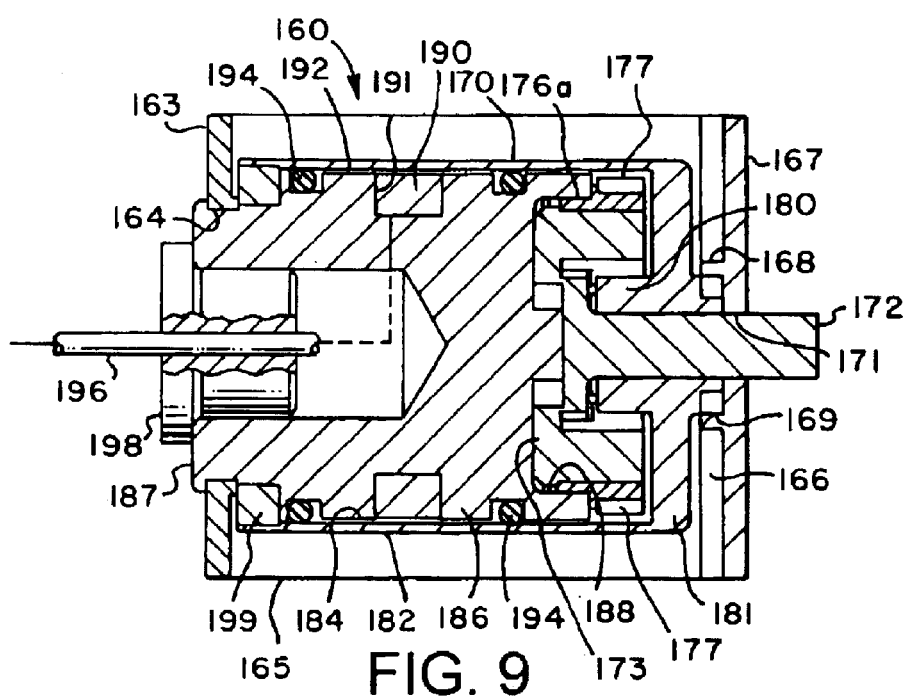
FIG. 9 is a section view taken generally along the line 9—9 of FIG. 8.
Figure 10:
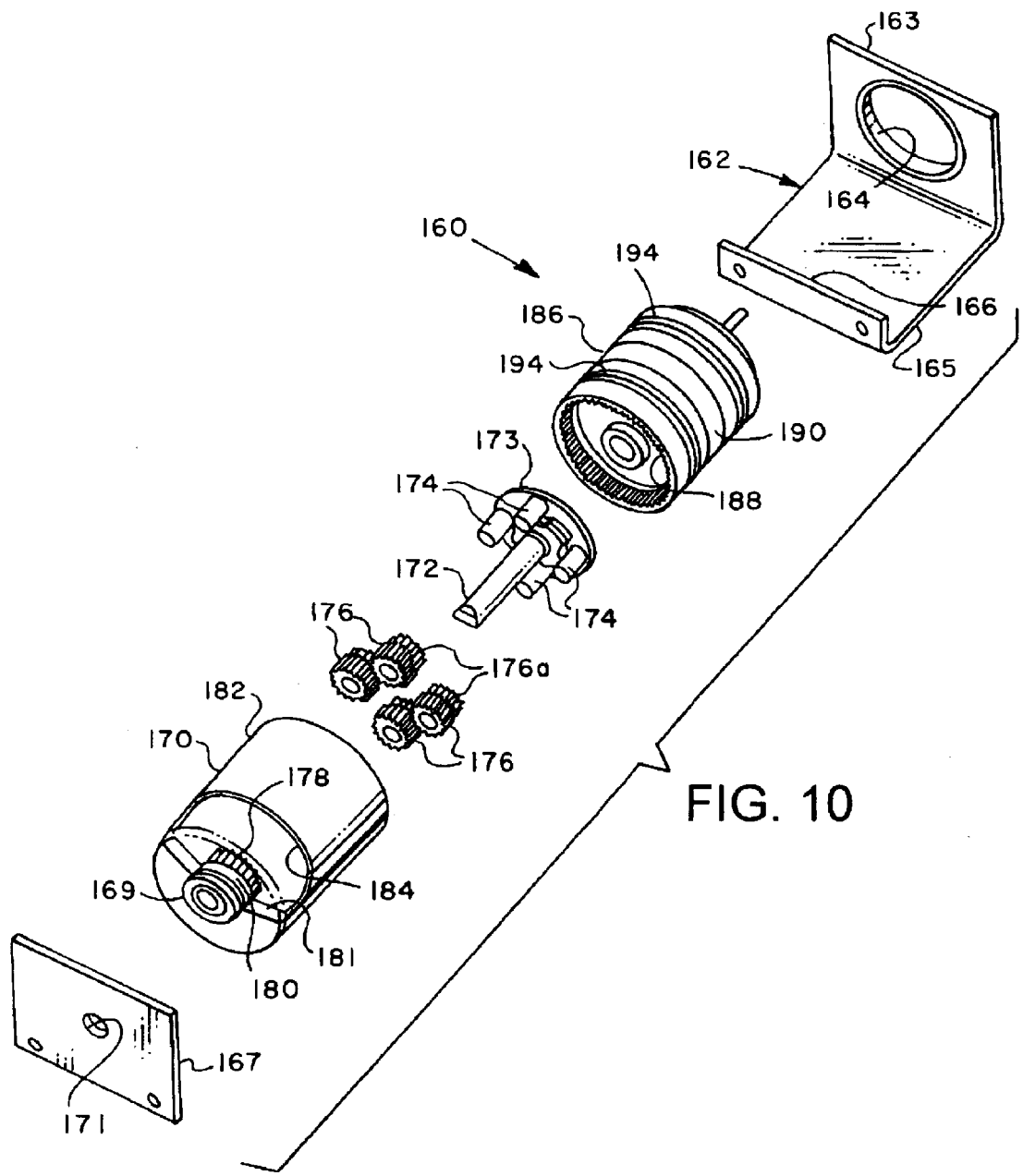
FIG. 10 is an exploded perspective view of the actuator shown in FIGS. 8 and 9.

Referring now to FIGS. 8 through 10, a second alternate embodiment of a belt actuator or retarder is illustrated and generally designated by the numeral 160. The actuator 160 is supported on a somewhat U-shaped support bracket 162 including a first leg 163 having a relatively large diameter bore 164 formed therein, FIGS. 9 and 10. Bracket 162 includes a base 165, a second shorter leg 166 extending generally parallel to the leg 163 and a separable leg part 167, which may be suitably connected to the leg part 165 by conventional threaded fasteners, not shown, or by permanently attaching the leg part 167 as by welding. Bracket leg part 167 includes a cylindrical collar portion 168, FIG. 9, forming a support for a generally cylindrical stub projection 169 of a generally cylindrical hollow can-shaped outer housing 170 of the actuator 160. Bracket part 167 is also provided with a cylindrical bore 171 for receiving an input shaft 172 of the actuator 160. The actuator or retarder 160 may be mounted on the frame member 30, 31 in place of the actuator 32 with shaft 172 suitably connected to reel shaft part 24 for rotation therewith.

Referring further to FIGS. 9 and 10, in particular, shaft 172 also comprises a planet gear carrier including a circular disc part 173 supporting spaced apart stub shafts 174 for respective differential planet gears 176. Differential planet gears 176 include gear portions 177 which are meshed with a sun gear 178 formed on an axial hub part 180, FIG. 9, of outer housing 170. Outer housing 170 includes the integral hub part 180 which is formed integral with an end wall 181. End wall 181 is formed integral with a cylindrical, relatively thin-walled can part 182 of outer housing 170 and having an inner, cylindrical bore wall 184.

The actuator or retarder 160 is further characterized by a generally cylindrical core member 186 which includes an internal ring gear 188 formed at one end thereof and meshed with reduced diameter spur gear parts 176a of differential planet gears 176. Core member 186 is adapted to support a toroidal electromagnetic coil 190 in an annular groove 191 intersecting an outer circumferential surface 192 of core member 186. The diameter of the core member 186 which defines the circumferential surface 192 is slightly less than the diameter of the bore wall 184 to provide an annular clearance space between the core member 186 and the housing 170. This clearance space is filled with a suitable magnetorheological fluid which is retained between o-ring seals 194 disposed in spaced apart annular grooves formed in the core member 186, as shown in FIGS. 9 and 10. As shown in FIG. 9, the core member 186 is secured to the bracket leg 163 by a hub portion 187 which projects through the bore 164. The core member 186 is suitably fixed to the leg 163 non rotatably relative thereto.

Electrical conductor means 196 extends through a strain relief member 198 supported on the core member 186 and is operably connected to the coil 190. Accordingly, when an electrical current is applied in coil 190, a magnetic field is generated which intersects the aforementioned annular space between bore wall 184 and surface 192 and is operable to modify the shear properties of the magnetorheological fluid such that a shearing force is exerted between the core member 186 and the housing 170 which will retard rotation of the housing relative to the core member. The housing 170 tends to rotate at a speed greater than the speed of the input shaft 172 thanks to the differential planetary speed increasing gearset arranged between the shaft 172 and the housing 170, as described above. A suitable retaining ring 199 is secured to the housing 170 and the core member 186 for securing the housing and core member to each other while permitting relative rotation between the housing and the core member. Accordingly, a selectively variable retarding force may be imposed on the seatbelt retractor reel 18 and the belt 20 if the actuator 160 is connected to the retractor reel in place of the actuator 32. Conductor means 90 is, of course, connected to the conductor means 196 if the actuator or retarder 160 is used in place of the retarder 32.

Figure 11:
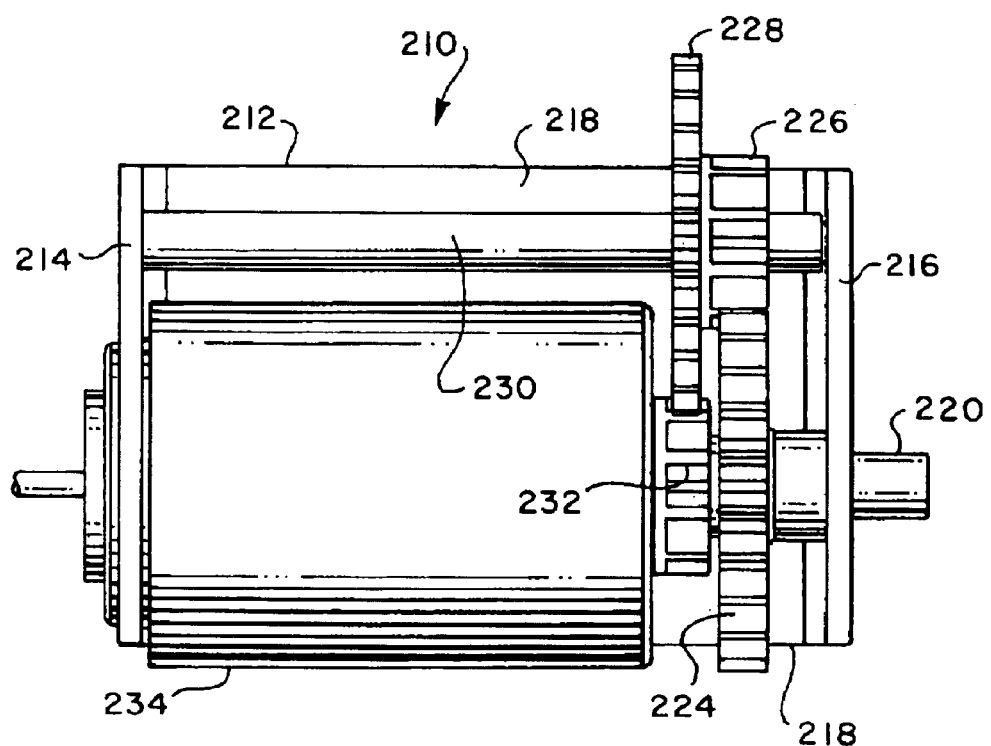
FIG. 11 is a top plan view of a third alternate embodiment of a belt actuator in accordance with the invention.
Figure 12:
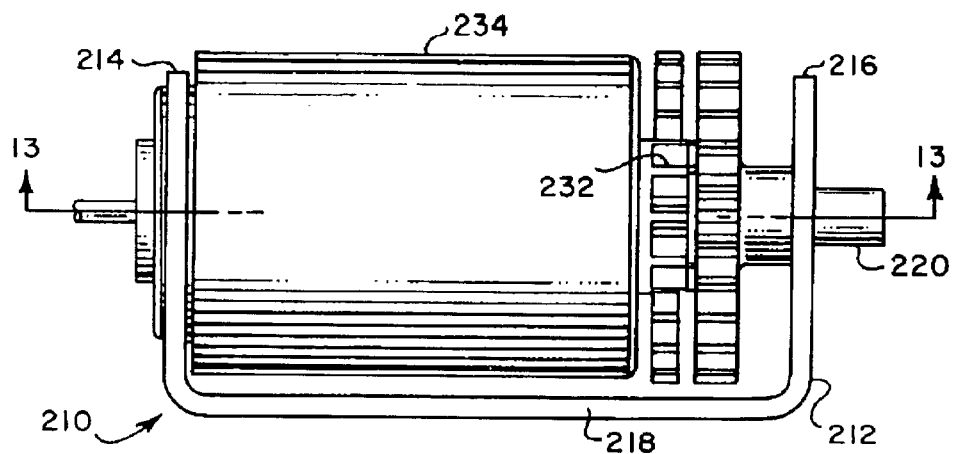
FIG. 12 is a side elevation of the actuator shown in FIG. 11.
Figure 13:
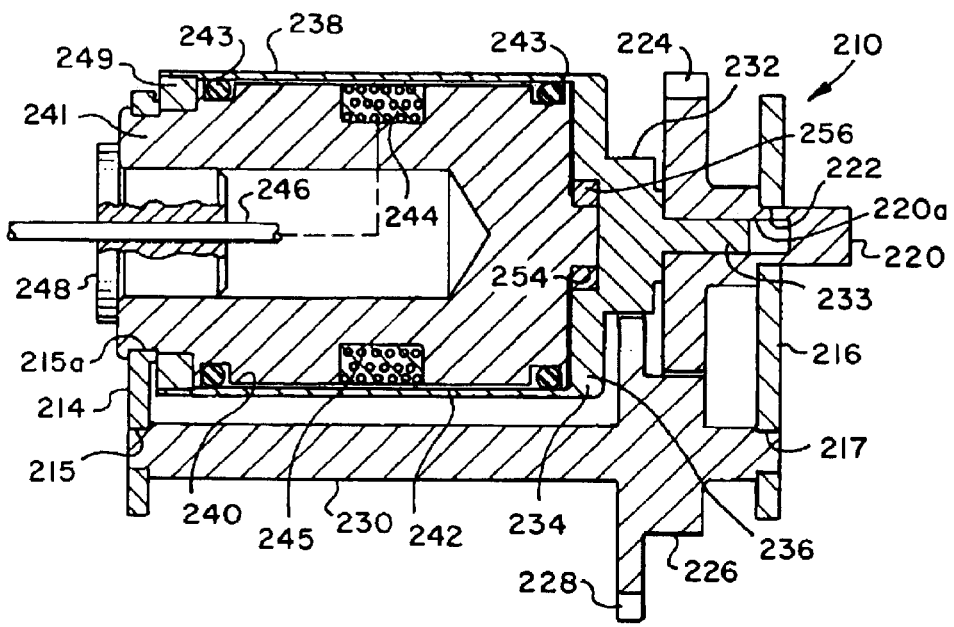
FIG. 13 is a section view taken generally from the line 13—13 of FIG. 12.

Referring now to FIGS. 11, 12 and 13, a third alternate embodiment of a belt actuator or retarder in accordance with the invention is illustrated and generally designated by the numeral 210. The actuator 210 includes a somewhat channel-shaped support bracket 212 including opposed upstanding parallel flanges 214 and 216 interconnected by a web 218. The actuator or retarder 210 also includes a rotatable input shaft 220 which is partially supported in a bore 222 formed in flange 216, FIG. 13. Shaft 220 comprises part of a parallel shaft speed increasing gearset which includes a spur gear 224 formed integral with the shaft 220 and which is meshed with a pinion 226 formed integral with a gear 228 on an elongated parallel shaft 230. Shaft 230 is supported for rotation on and between the bracket flanges 214 and 216 in suitable bores 215 and 217, FIG. 13. Spur gear 228 is meshed with a pinion 232 formed integral on a retarder housing 234, similar in some respects to the housing 186 for the actuator or retarder 160.

Pinion 232 is formed integral with an end wall 236 of housing 234, as shown in FIG. 13 and housing 234 includes an elongated, generally cylindrical tubular can part 238 having a cylindrical inner bore wall 240. Housing 234 is sleeved over a generally cylindrical core member 230 having an outer cylindrical circumferential wall 242 dimensioned to leave a relatively thin annular space between circumferential surface or wall 242 and bore wall 240. The aforementioned space is also delimited by spaced apart o-ring seals 243 which are supported in suitable annular grooves formed in core member 241 and are engagable with bore wall 240 to provide a fluid tight seal for a quantity of magnetorheological fluid disposed in the space defined between the bore wall 240 and the circumferential surface 242 and the o-ring seals 243. An electromagnetic coil 244 is mounted in a circumferential groove 245 formed in core part 241 and is connected to suitable conductor means 246 extending through a strain relief member 248 mounted on core member 241.

As further shown in FIG. 13, core member 241 is mounted in a bore 215a of flange 214 and is secured to flange 214 against rotation relative thereto. Core member 241 is also retained against axial displacement relative to the housing 234 by a suitable retaining ring and bearing 249 in a manner similar to the arrangement between the housing and core member of actuator or retarder 160. Core member 241 also includes a trunnion 254 coaxial with circumferential surface 242 and supported in a bearing 256 which, in turn, is supported by the end wall 236 of housing 234. Housing hub 232 includes a stub-shaft part 233 supported in a bearing bore 220a of shaft 220, as shown in FIG. 12.

Accordingly, the actuator or retarder 210 is operable in generally the same manner as the actuators 32, 110 and 160 and the actuator 210 may be suitably supported by the frame 30, 31 with its shaft 220 coupled to the reel shaft part 24 for rotation therewith to retard dereeling of the belt 20 from the reel 18 under substantial forces acting on the belt, particularly when the coil 244 is energized by the controller 92 to generate a magnetic field passing through the space formed between the housing 234 and the core part 241 which is filled with the magnetorheological fluid, as previously described. In the embodiment illustrated in FIGS. 11 through 13, the speed increasing gear train is disposed exterior of the housing 234 instead of being disposed within the housing as with the actuator or retarder 160. The actuator or retarder 210 operates generally in the same manner as the other embodiments described hereinbefore.

Those skilled in the art will appreciate that, in the embodiments of the actuator or retarder 160 and 210, the housings 170 and 234 may be modified to comprise a reel over which the belt 20 may be wound and secured thereto so that belt dereeling retarding forces may be applied directly as the belt tends to unreel from the outer surfaces of these housings. Of course, if the actuators or retarders 160 and 210 were modified to form the seatbelt retractor, a conventional spring retractor mechanism 26 would likely be required, for example, to be connected to the housing in a suitable manner.

Those skilled in the art will appreciate that the actuators or retarders 32, 110, 160 and 210 may be operated using a conventional magnetorheological fluid and that the parts surrounding the electromagnetic coils of each embodiment may be formed of suitable magnetic materials in such a manner as to direct the magnetic flux lines across the previously described fluid filled passages formed in the actuators 32, 160 and 210 to provide control over the shear properties of the fluid. Magnetorheological fluids, such as described in U.S. Pat. No. 2,661,596 to Winslow or U.S. Pat. No. 5,398,917 to Carlson et al. may be suitable for use with the actuators or retarders 32, 110, 160 and 210, for example.

The construction and operation of the seatbelt actuators or retarders 32, 110, 160 and 210 is believed to be understandable to those of ordinary skill in the art from the foregoing description read in conjunction with the drawings. Although preferred embodiments of the invention have been described in detail, those skilled in the art will also recognize that various substitutions and modifications may be made without departing from the scope and spirit of the appended claims.

What is claimed is:

1. In a retractor for a restraining belt for a vehicle occupant, including a reel for winding said belt thereon, a retarder mechanism for the vehicle occupant restraining belt retractor operably connected to said reel and including a quantity of a magnetorheological fluid responsive to a magnetic field imposed thereon to selectively control dereeling of said belt, wherein said mechanism includes a housing, including a space occupied by said quantity of said fluid and an electromagnetic coil supported on said mechanism and operable to impose a magnetic field on said fluid to selectively change properties of said fluid and a belt dereeling retarding force imposed on said retractor, and wherein said housing includes a generally cylindrical part defining a cylindrical bore wall and said mechanism includes a core member disposed in said housing and in spaced relationship to said bore wall to form an annular passage, and said coil is disposed in proximity to said annular passage to impose a magnetic field on said passage and on a quantity of said fluid disposed therein, and a rotatable input shaft operably connected to said housing for rotating said housing with respect to said core member in response to a dereeling force exerted by said belt.

2. The mechanism set forth in claim 1 wherein:

said shaft is connected to said housing by a speed increasing gear drive.

3. The mechanism set forth in claim 2 wherein:

said gear drive is disposed in said housing.

4. The mechanism set forth in claim 1 wherein:

said shaft is coupled to said housing by a parallel shaft speed increasing gear drive.

5. The mechanism set forth in claim 4 wherein:

said gear drive is disposed exterior of said housing.

6. In a retractor for a restraining belt for a vehicle occupant, including a reel for winding said belt thereon, a retarder mechanism for the vehicle occupant restraining belt retractor operably connected to said reel and including a housing comprising a generally cylindrical part defining a cylindrical bore wall, a core member disposed in said housing and in spaced relationship to said bore wall to form an annular passage, an electromagnetic coil is disposed in proximity to said passage to impose a magnetic field on said and a quantity of a magnetorheological fluid disposed in said passage to selectively control dereeling of said belt and a rotatable input shaft operably connected to said housing for rotating said housing with respect to said core member in response to a dereeling force exerted by said belt.

7. The mechanism set forth in claim 6 wherein:

said shaft is connected to said housing by a speed increasing gear drive.

8. The mechanism set forth in claim 7 wherein:

said gear drive is disposed in said housing.

9. The mechanism set forth in claim 7 wherein:

said shaft is operably connected to said housing by a parallel shaft speed increasing gear drive.

10. The mechanism set forth in claim 9 wherein:

said gear drive is disposed exterior of said housing.

* * * * *